United States Patent [19]

Parsoneault et al.

[11] Patent Number: 5,577,842
[45] Date of Patent: Nov. 26, 1996

[54] ABSORBENT OIL BARRIER FOR HYDRODYNAMIC BEARING

[75] Inventors: Norbert S. Parsoneault, Watsonville; Hans Leuthold, Santa Cruz, both of Calif.

[73] Assignee: Seagate Technology, Inc., Scotts Valley, Calif.

[21] Appl. No.: 521,611

[22] Filed: Aug. 30, 1995

[51] Int. Cl.[6] .................................................. F16C 17/10
[52] U.S. Cl. ............................................ 384/114; 384/383
[58] Field of Search .................................... 384/114, 119, 384/123, 124, 383, 382

[56] References Cited

U.S. PATENT DOCUMENTS

| | | | |
|---|---|---|---|
| 4,915,510 | 4/1990 | Arvidsson | 384/121 |
| 5,284,391 | 2/1994 | Diel et al. | 384/108 |
| 5,323,972 | 6/1994 | Kjellqvist | 384/121 |
| 5,328,271 | 7/1994 | Titcomb | 384/108 |

*Primary Examiner*—Lenard A. Footland
*Attorney, Agent, or Firm*—Flehr, Hohbach, Test, Albritton & Herbert

[57] ABSTRACT

A hydrodynamic bearing assembly including a shaft and surrounding bushing which define a journal, the shaft and bushing defining at the end thereof which is open to the ambient atmosphere a shelf-like surface. An absorbent washer, preferably formed of a very clean, particle free absorbent paper is placed on this surface, and preferably held in place by a plastic or metal retainer. Typically, the retainer is pressed in place and held in place by spring force or the like, so that the washer is held tightly against the surface.

16 Claims, 2 Drawing Sheets

ABSORBENT OIL BARRIER FOR HYDRODYNAMIC BEARING

FIELD OF THE INVENTION

The present invention relates to the field of hydrodynamic bearing assemblies of the type which provides support and rotation for a high-speed spindle element. More specifically, the present invention relates to improved method and apparatus for preventing fluid loss from a hydrodynamic bearing.

RELATED APPLICATIONS

The invention disclosed herein will find uses in many different types of hydrodynamic bearing assemblies; an example of such a hydrodynamic bearing is found in the application entitled Single Plate Hydrodynamic Cartridge Bearing, Ser. No. 08/546,932 filed Oct. 23, 1995, invented by Nagarathnam et al.; also the application entitled Thrust-bearing Built with Single Sided Grooved Plate, Ser. No. 08/545,514 filed Oct. 19, 1995 invented by Heine et al.; a further related application is entitled Vacuum Fill Technique for Hydrodynamic Bearing, Ser. No. 08/503,568 filed Jul. 18, 1995 invented by Parsoneault et al.; these are filed contemporaneously with this application and assigned to the assignee of the present application and incorporated herein by reference.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle, the information being accessed by means of transducers located on a pivoting arm which moves radially over the surface of the disc. The read/write heads or transducers must be accurately aligned with the storage tracks on the disc to ensure proper reading and writing of information; thus the discs must be rotationally stable.

During operation, the discs are rotated at very high speeds within an enclosed housing by means of an electric motor which is generally located inside the hub or below the discs. One type of motor in common use is known as an in-hub or in-spindle motor. Such in-spindle motors typically have a spindle mounted by means of two ball bearing systems to a motor shaft disposed in the center of the hub. One of the bearings is typically located near the top of the spindle, and the other near the bottom. These bearings allow for rotational movement between the shaft and hub, while maintaining accurate alignment of the spindle to the shaft. The bearings themselves are normally lubricated by grease or oil.

The conventional bearing system described above, however, is prone to several shortcomings. First is the problem of vibration generated by the balls rolling on the raceways. Ball bearings used in hard disc drive spindles run under conditions that generally guarantee physical contact between raceway and ball, in spite of the lubrication layer provided by the bearing oil or grease. Hence, bearing balls running on the generally smooth but microscopically uneven and rough raceways; they transmit this surface structure as well as their imperfection in sphericity in the form of vibration to the rotating disc. This vibration results in misalignment between the data tracks and the read/write transducer. This source of vibration limits the data track density and the overall performance of the disc drive system.

Another problem is related to the application of hard disc drives in portable computer equipment, resulting in severely increased requirements for shock resistance. Shocks create relative acceleration between the discs and the drive casing which in turn show up as a force across the bearing system. Since the contact surfaces in ball bearings are very small, the resulting contact pressures may exceed the yield strength of the bearing material, and leave long term deformation and damage to the raceway and the balls of the ball bearing.

Moreover, mechanical bearings are not easily scaleable to smaller dimensions. This is a significant drawback since the tendency in the disc drive industry has been to continually shrink the physical dimensions of the disc drive unit.

As an alternative to conventional ball bearing spindle systems, researchers have concentrated much of their efforts on developing a hydrodynamic bearing. In these types of systems, lubricating fluid—either gas or liquid—functions as the actual bearing surface between a stationary base or housing in the rotating spindle or rotating hub of the motor. For example, liquid lubricants comprising oil, more complex ferro-magnetic fluids or even air have been utilized in hydrodynamic bearing systems. The reason for the popularity of the use of air is the importance of avoiding the outgassing of contaminants into the sealed area of the head/disc housing. However, air does not provide the lubricating qualities of oil. The relatively higher viscosity of oil allows for larger bearing gaps and therefore looser tolerance standards to achieve similar dynamic performance.

However, the very fact that oil flows easily over a metal surface presents a problem for hydrodynamic bearings, in that at least one end of the bearing must be open to the surrounding atmosphere. A totally sealed hydrodynamic bearing could not create the proper pressure distribution to establish the necessary stiffness and function effectively as a high speed motor bearing.

Slight inaccuracies in the amount of oil used in the bearing may result in some small spilling of oil from the journal. Further, in the event of a severe shock to the disc drive, some of the oil may be jarred out of the bearing. Means must be provided for preventing any of the oil in the bearing from escaping through the opening in the motor into the surrounding atmosphere, as such escaping oil would quickly migrate to and damage the surface of the rotating disk.

In view of the many long term benefits of a reliable hydrodynamic bearing design which is engineered to prevent the loss of oil or other lubricating fluid, the establishment of such a design is highly desirable.

SUMMARY OF THE INVENTION

It is therefore an objective of the present invention to provide a hydrodynamic bearing designed to be simple and reliable in design yet incorporate means for preventing the loss of oil or other lubricating fluid.

It is a further objective of the invention to provide a hydrodynamic bearing design having means for preventing loss of oil where the barrier is simple and easy to manufacture or incorporate in the manufacturing process.

It is a further related objective of the invention to provide an oil barrier which is inexpensive and easily incorporated in the manufacturing process.

These and other objectives of the present invention are achieved in a hydrodynamic bearing assembly including a shaft and surrounding bushing which define a journal, the shaft and bushing defining at the end thereof which is open to the ambient atmosphere a shelf-like surface. An absorbent washer, preferably formed of a very clean, particle free absorbent paper is placed on this surface, and preferably held in place by a plastic or metal retainer. Typically, the retainer is pressed in place and held in place by spring force or the like, so that the washer is held tightly against the surface. The high capillary forces in the washer trap the oil; therefore the oil migrates slowly through the paper away from the opening; the exposed surface of the paper is minimized by placing the washer or the like over the lateral surface of the paper. Therefore, the only evaporation that can occur is at the very thin annulus at the inner diameter of the washer.

This barrier is especially useful in conjunction with a hydrodynamic bearing used in a spindle motor incorporated in a disc drive; however, the washer is equally useful in other styles of hydrodynamic bearings.

Other features and advantages of the present invention will become apparent to a person of skill in the art who studies the following detailed description of a preferred embodiment of the apparatus for the present invention given in conjunction with the accompanying drawings.

DETAILED DESCRIPTION OF A PREFERRED EMBODIMENT

Figure 1:
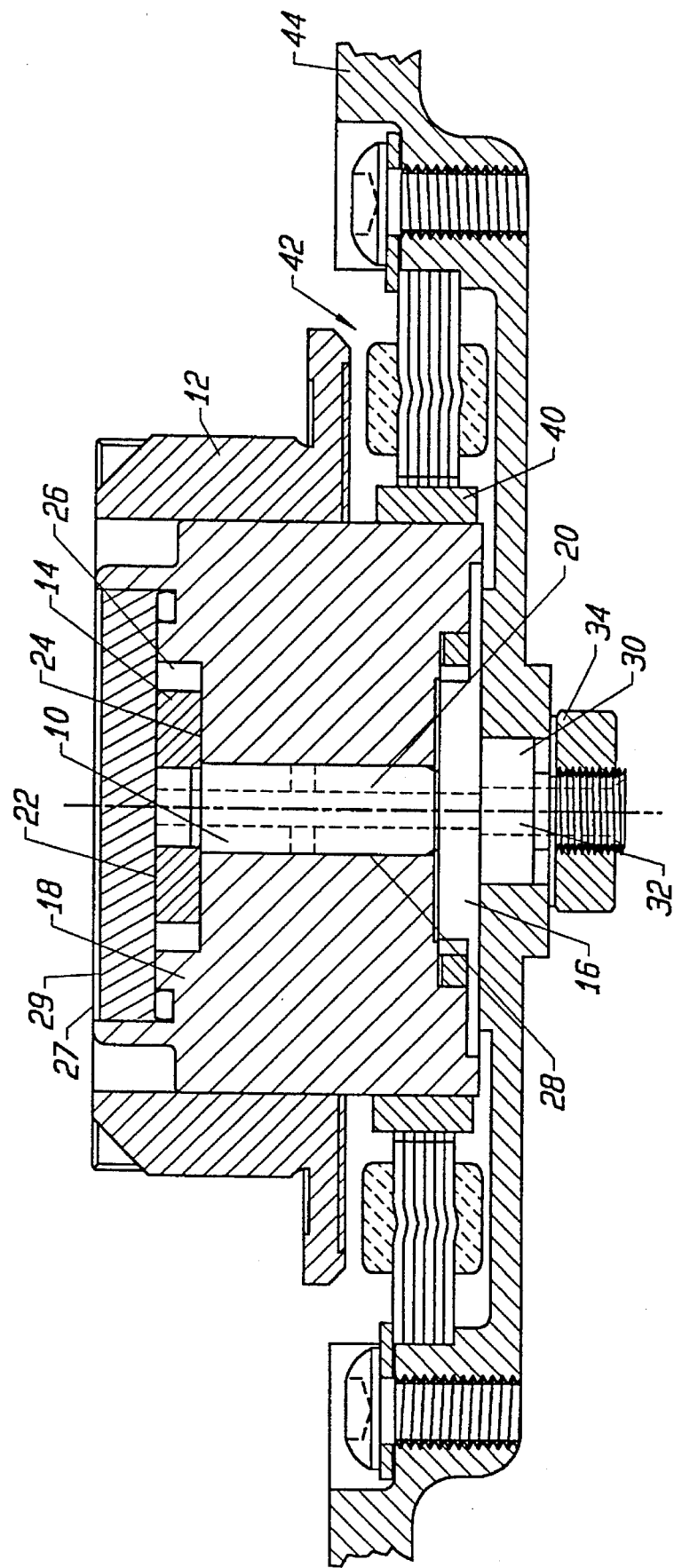
FIG. 1 illustrates a typical hydrodynamic bearing motor in which the invention is useful.

The following description of a preferred embodiment of an absorbent oil barrier incorporated in a hydrodynamic bearing is shown in conjunction with a spindle motor for a hard disc drive. However, the apparatus is equally useful in any hydrodynamic bearing which is of a structure that can be adapted for use under any atmospheric conditions, and especially those where the loss of any oil or fluid from the bearing would have serious negative consequences.

Hydrodynamic bearings have many uses other than in hard disc drives and the invention is not intended to be limited to uses in such an environment. However, it is especially useful in hydrodynamic bearings for hard disc drives because of the importance of not having any residual fluid either leak out of the motor or be expelled from the bearing over the entire life of the bearing, as such would contaminate the atmosphere within the hard disc drive with droplets or outgassing.

It is always a major concern in the design of a hydrodynamic hard disc drive spindle motor to ensure that the lubricant or fluid is confined to the region where it lubricates the rotating surfaces, and cannot migrate to the regions where the data storing discs are located.

The basic principles of the invention will be explained with respect to a hydrodynamic bearing utilized in a spindle motor whose description may be found in greater detail in the application entitled Thrust Bearing Built With Single Sided Grooved Plates, SEA2336, Attorney's Docket A-60464 invented by Heine, Leuthold, Nagarathman, Jennings and Parsoneault, filed contemporaneously herewith and incorporated herein by reference. The basic structure of the motor, or at least as much as is relevant to this invention, includes a stationary shaft 10 and a hub 12 which rotates around the shaft. The shaft includes a thrust plate 14 at one end, and ends in a shoulder 16 at the opposite end. The hub includes a bushing 18 which houses a counterplate # at one end. One of the two opposing surfaces of the shaft/thrustplate assembly and bushing/counterplate assembly typically carries cylindrical sections of spiral grooves as is well known in this technology.

The fluid is supplied to all the lubricated surfaces from a reservoir 20 which runs through the center of the shaft 10. The lubricated surfaces include both the top and bottom sides 22, 24 of the thrust plate, the outside diameter 26 of the thrust plate, and the outside surface 28 of the circular shaft. The number and location of lubricated surfaces is not significant to this invention; what is important is that they be in communication with a reservoir into which the fluid is to be inserted during the filling process.

The remaining elements of the motor which are of structural significance to this description are the septum or rubber plug 32 located in the shaft center bore; and a nut 34 located at the end of the shaft which is necessary to hold the primary structural elements of the motor together, and typically assemble it into the base.

Figure 2:
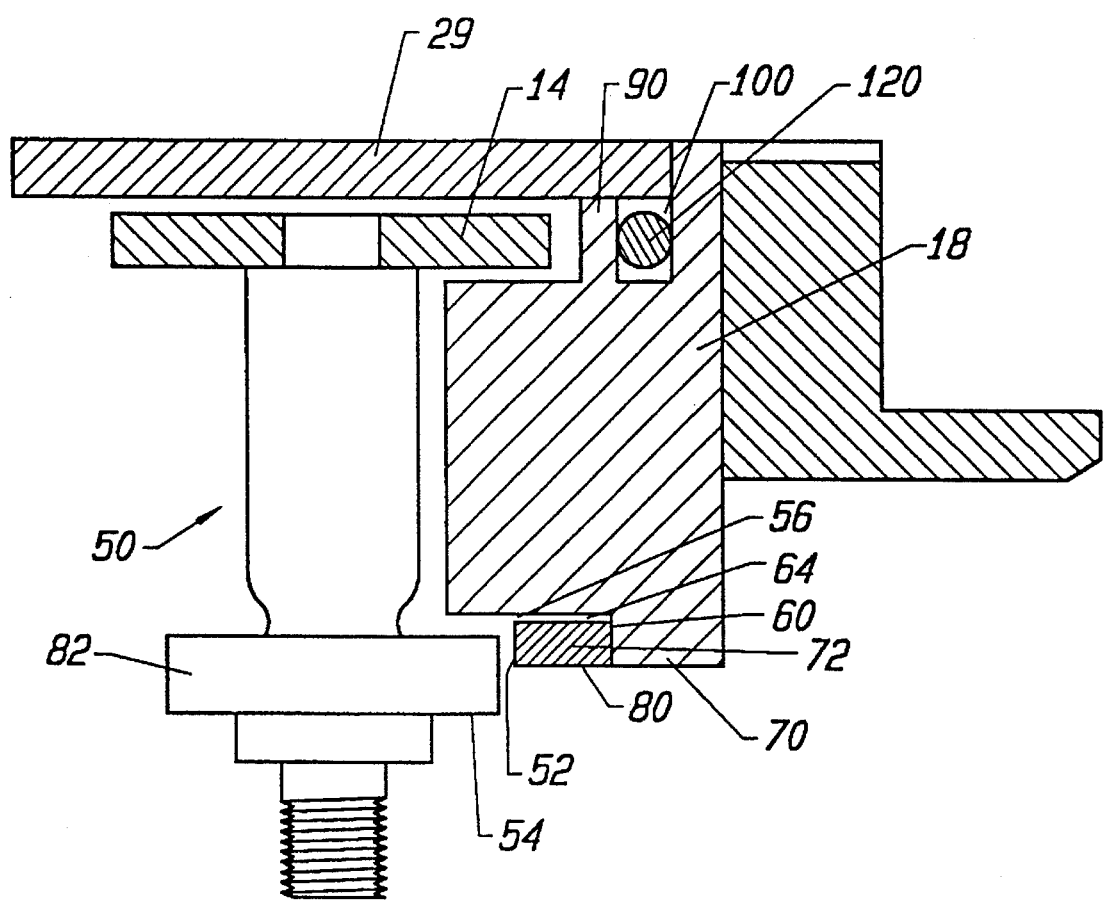
FIG. 2 illustrates a broken away section, the essential features of the hydrodynamic bearing of the present invention.

Referring next to FIG. 2, this figure illustrates the salient features of the present invention. Specifically, as can be seen at the bottom of the hydrodynamic bearing generally indicated here at 50, the bearing is open to the outside atmosphere at the opening 52. This opening is necessary so that the fluid can be pumped against the outside ambient pressure to create the pressure distribution across the surface of the bearing and thus the requisite stiffness. However, as discussed above, it is absolutely essential that none of the fluid or oil used to lubricate the bearing be able to flow out through this opening 52. It is already known in this field to apply a barrier surface film over the surface area 54 of one side of the opening to the atmosphere. It is also known to provide a relatively wide opening 52 so that capillary action cannot influence the flow of the lubricating fluid over the opposite surface 56 of the opening. However, there may still be a problem with some residual oil from the filling process, or oil from the journal being on the surface 56 and eventually working its way out into the HDA of the hard disc drive.

In order to avoid this problem, an absorbent washer 60 comprised of a thin piece of very fine paper is laid down on the horizontal surface 56 which forms one side of the opening. This paper which is also known as clean room paper because it is used in clean room facilities in highly cleaned environments, is highly absorbent, and does not shed particles, is typically at 0.005" thick and has sufficient width to cover a significant portion of the horizontal surface 64 of the sleeve. Thus, any oil which is left over from the filling process, or which may attempt to exit the bearing during use of the motor, is absorbed by the exposed edge of the absorbent washer, and then moved away from the exposed edge surface of the washer by capillary action.

The sleeve 18 of the bearing includes a shoulder region 70 with a vertical surface at the interior side.

A plastic or metal retainer 80 is provided which preferably is inserted and kept in place by a spring force, the retainer pressing against the vertical surface 72 of shoulder 70. Alternatively, it can be glued in place against the shoulder. In either case, it is a washer shaped retainer having the same width as the absorbent paper washer 60. The retainer presses against the absorbent washer and holds it in place. It also covers all the exposed surface of the washer except the exposed edge 56 of the washer, so that oil is picked up by the washer and moved away from the exposed edge by capillary action. The evaporation of the oil back into the atmosphere can then only occur at the very thin annulus which appears at the inner diameter of the washer. The outer surface 82 of the retainer is preferably also coated with a barrier film, to make it even more difficult for any oil to escape the bearing.

As noted above, the paper should be about 0.005" minimum. The competing issues to be considered in deciding the thickness of the paper, are that the paper can be saturated with the oil absorbed if it is not thick enough paper; but with very fine paper, the capillary action which moves the oil away from the exposed annulus at the inner diameter of the paper washer is greater.

It should further be noted that the paper washer and its retainer are the last two items to be inserted into the hydrodynamic bearing, so that the bearing is already filled with its lubricating fluid as according to the process described in the above incorporated application. Thus the absorbent washer will be useful both for absorbing any residual oil left from the filling process, as well as absorbing any oil which may attempt to flow out along one side of the opening.

The washer which is as noted above, paper selected to be about 0.005", may be increased in thickness simply by adding a second washer. The barrier film is typically applied to the plastic or metal retainer simply by dipping the retainer in the barrier film before it is inserted or glued in place in the hydrodynamic bearing.

A further feature is added to the present invention to prevent the escape of any lubricating fluid. As can be seen in both FIG. 2 and FIG. 1, there are two relatively rotating surfaces at the opposite or what appears here is the upper end of the shaft comprising the thrust plate 14 and the counterplate 29. Lubricating fluid is located between these two surface; and since the adjoining surface 90 of the sleeve 18 is a flat surface which is butted up against another flat surface of the counterplate 29, it is possible for some fluid to move out between these two surfaces, and potentially reach the surrounding atmosphere of the bearing. Therefore, a groove 100 is incorporated in the upper surface 90 of the sleeve, and a rubber O-ring 102 is incorporated in this groove and fills most the vertical extent of the groove so that when the counterplate 19 is pressed in place against the sleeve, the O-ring is compressed forming a tight seal which seals the two surfaces 90, 91 of the sleeve and counterplate so that no lubricating fluid can exit along this path.

Other features and advantages of the present invention may become apparent to a person of skill in the art who studies the present invention disclosure. Therefore, the scope of the present invention is to be limited only by the following claims.

We claim:

1. A hydrodynamic bearing comprising
a shaft and surrounding sleeve relatively rotatable to one another, the shaft and sleeve having lubricating fluid covering their facing surfaces, the surfaces of the shaft and sleeve terminating at one end in an opening, and one of said shaft or sleeve surfaces having an absorbent paper washer thereon for absorbing any excess lubricating fluid, and held in place by a retainer ring which covers the exposed surface of the washer except for an edge of the washer presented to the lubricating fluid, so that the fluid is moved away from the exposed edge of the paper by capillary action and is not exposed to the surrounding environment for evaporation.

2. A hydrodynamic bearing as claimed in claim 1 wherein said shaft ends in a horizontal shoulder and said sleeve ends in a facing horizontal surface,
said absorbent paper washer surrounding said opening and pressed against said horizontal surface of said sleeve and held in place by a retainer pressed against said horizontal surface of said absorbent washer.

3. A hydrodynamic bearing as claimed in claim 2 wherein said absorbent washer is approximately 0.005" thick.

4. A hydrodynamic bearing as claimed in claim 3 wherein said retainer has a surface facing the said opening between said sleeve and said shaft,
said surface being coated with a barrier film to further reduce the possibility of fluid exiting said hydrodynamic bearing.

5. A hydrodynamic bearing as claimed in claim 1 wherein said sleeve includes at an opposite end from said absorbent paper layer along said shaft, a horizontal surface perpendicular to said shaft, said shaft ending in a thrust plate which is fixed to said shaft, said sleeve supporting at said opposite end, the counter plate underlying said thrust plate, and said opposite end of said sleeve further including a recess having a flexible O-ring therein, said O-ring being pressed against said counter plate to prevent any loss of fluid from said thrust plate and counter plate past an end of said counter plate.

6. A hydrodynamic bearing as claimed in claim 5, wherein said O-ring is rubber, and said recess adjoins an end of said counter plate.

7. A hydrodynamic bearing as claimed in claim 6 wherein said shaft ends in a horizontal shoulder and said sleeve ends in a facing horizontal surface,
said absorbent paper washer surrounding said opening and pressed against said horizontal surface of said sleeve and held in place by a retainer pressed against said horizontal surface of said absorbent washer.

8. A hydrodynamic bearing as claimed in claim 6 wherein said absorbent washer is approximately 0.005" thick.

9. A disc drive spindle motor comprising a shaft having a thrust plate at one end and a fixed shoulder at the other end, and including a sleeve rotating relative to said shaft and having a hub affixed thereto and rotating with said sleeve for supporting one or more discs in a disc data storage system hydrodynamic bearing comprising said shaft and said sleeve having lubricating fluid covering their facing surfaces, the surfaces of the shaft and sleeve defining at one end an opening, and one of said shaft or said sleeve surfaces having an absorbent paper washer thereon for absorbing any excess lubricating fluid, and held in place by a retainer ring which covers the exposed surface of the washer except for an edge of the washer presented to the lubricating fluid, so that the fluid is moved away from the exposed edge of the paper by capillary action and is not exposed to the surrounding environment for evaporation.

10. A spindle motor as claimed in claim 9 wherein said shaft ends in a horizontal shoulder and said sleeve ends in a facing horizontal surface,
said absorbent paper washer surrounding said opening and pressed against said horizontal surface of said sleeve and held in place by a retainer pressed against said horizontal surface of said absorbent washer.

11. A spindle motor as claimed in claim 10 wherein said absorbent washer is approximately 0.005" thick.

12. A spindle motor as claimed in claim 11 wherein said retainer has a surface facing the said opening between said sleeve and said shaft,
said surface being coated with a barrier filmed to further reduce the possibility of fluid exiting said spindle motor.

13. A spindle motor as claimed in claim 10 wherein said sleeve includes at an opposite end from said absorbent paper layer along said shaft, an axial surface perpendicular to said shaft, said shaft ending in said thrust plate which is fixed to said shaft, said sleeve supporting at said opposite end the end plate underlying said thrust plate, and said opposite end of said sleeve further including a recess having a flexible O-ring therein, said O-ring being pressed against said counter plate to prevent any loss of fluid from said thrust plate and counter plate past an end of said counter plate.

14. A spindle motor as claimed in claim 13, wherein said O-ring is rubber, and said recess adjoins an end of said counter plate.

15. A spindle motor as claimed in claim 14 wherein said shaft ends in a horizontal shoulder and said sleeve ends in a facing horizontal surface, said absorbent paper washer surrounding said opening and pressed against said horizontal surface of said sleeve and held in place by a retainer pressed against said horizontal surface of said absorbent washer.

16. A spindle as claimed in claim 15 wherein said absorbent washer is approximately 0.005" thick.

* * * * *